United States Patent
DeCusatis et al.

(10) Patent No.: US 8,737,228 B2
(45) Date of Patent: May 27, 2014

(54) FLOW CONTROL MANAGEMENT IN A DATA CENTER ETHERNET NETWORK OVER AN EXTENDED DISTANCE

(75) Inventors: Casimer DeCusatis, Poughkeepsie, NY (US); Thomas A. Gregg, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 395 days.

(21) Appl. No.: 11/862,664

(22) Filed: Sep. 27, 2007

(65) Prior Publication Data
US 2009/0086635 A1  Apr. 2, 2009

(51) Int. Cl.
*H04L 1/00* (2006.01)
*H04L 12/56* (2006.01)

(52) U.S. Cl.
CPC .......... *H04L 47/39* (2013.01); *H04L 47/21* (2013.01); *H04L 47/215* (2013.01); *H04L 47/30* (2013.01)
USPC ..... 370/236.1; 370/235; 370/236; 370/236.2; 370/242

(58) Field of Classification Search
CPC .............................. H04L 47/10; H04L 47/21
See application file for complete search history.

(56) References Cited

U.S. PATENT DOCUMENTS

| | | | |
|---|---|---|---|
| 5,497,369 A * | 3/1996 | Wainwright | 370/390 |
| 6,233,072 B1 * | 5/2001 | Liu et al. | 398/5 |
| 6,744,757 B1 | 6/2004 | Anandakumar et al. | |
| 6,901,050 B1 | 5/2005 | Acharya | |
| 2001/0029544 A1 * | 10/2001 | Cousins | 709/233 |
| 2003/0016683 A1 * | 1/2003 | George et al. | 370/404 |
| 2004/0032874 A1 * | 2/2004 | Fujiyoshi | 370/401 |
| 2004/0114614 A1 * | 6/2004 | Kawakami et al. | 370/401 |
| 2004/0196790 A1 | 10/2004 | Balakrishnan et al. | |
| 2004/0202155 A1 * | 10/2004 | Natarajan et al. | 370/360 |
| 2005/0027870 A1 | 2/2005 | Trebes, Jr. | |
| 2006/0098681 A1 * | 5/2006 | Cafiero et al. | 370/445 |
| 2006/0251067 A1 | 11/2006 | DeSanti et al. | |
| 2007/0011272 A1 | 1/2007 | Bakke et al. | |
| 2008/0165792 A1 * | 7/2008 | Strader et al. | 370/412 |

FOREIGN PATENT DOCUMENTS

WO  0122645 A1  3/2001

OTHER PUBLICATIONS

PCT Search Report PCT/EP2008/061715 Mailed Feb. 16, 2009.
Proposal for Traffic Differentiation in Ethernet Networks, [online]; [retrieved on Sep. 20, 2007], retrieved from the Internet, http://www.ieee802.0rg/1/files/public/docs2005/new-wadekar-virtual%20-links-0305.pdf.
Related U.S. Appl. No. 11/847,965, filed Aug. 30, 2007.

* cited by examiner

*Primary Examiner* — Kibrom T Hailu
*Assistant Examiner* — James P Duffy
(74) *Attorney, Agent, or Firm* — Cantor Colburn LLP; Steven Chiu

(57) ABSTRACT

Flow control in a data center Ethernet (DCE) network is managed between a source node and a destination node separated by an extended distance. An initiation sequence between the source node and the destination node is intercepted. The imitation sequence is for determining buffer credits available for receiving packets in the source node and the destination node. Replies are generated to the source node and the destination node indicating buffer credits available in at least one extended data interface interspersed between the source node and the destination node. The initiation sequence is completed based on the replies from the extended data interface.

17 Claims, 7 Drawing Sheets

FLOW CONTROL MANAGEMENT IN A DATA CENTER ETHERNET NETWORK OVER AN EXTENDED DISTANCE

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

The present invention relates generally to flow control, and more particularly, to flow control over extended distances.

Data Center Ethernet (DCE) is an emerging industry standard, which proposes modifications to existing networks, in an effort to position Ethernet as the preferred convergence fabric for all types of data center traffic. A recent study has found that Ethernet is the convergence fabric, with I/O consolidation in a Data Center as shown in FIG. 1. This consolidation is expected to simplify platform architecture and reduce overall platform costs.

Major changes have been proposed for DCE (also referred to as enhanced Ethernet and low latency Ethernet), including the addition of credit based flow control at the link layer, congestion detection and data rate throttling, and the addition of virtual lanes with quality of service differentiation. It is important to note that these functions do not affect Transmission Control Protocol/Internet Protocol (TCP/IP), which exists above the DCE level. It should also be noted that DCE is intended to operate without necessitating the overhead of TCP/IP. This offers a much simpler, low cost approach that does not require processing or accelerators.

SUMMARY

According to an exemplary embodiment, a method, system, and apparatus are provided for managing flow control in a data center Ethernet (DCE) network between a source node and a destination node separated by an extended distance. An initiation sequence between the source node and the destination node is intercepted, wherein the initiation sequence is for determining buffer credits available for receiving packets in the source node and the destination node. Replies are generated to the source node and the destination node indicating buffer credits available in at least one extended data interface interspersed between the source node and the destination node. The initiation sequence is completed based on the replies from the extended data interface. Data stored in the extended data interface may also be used for link recovery.

BRIEF DESCRIPTION OF THE DRAWINGS

Referring to the exemplary drawings, wherein like elements are numbered the several Figures.

DETAILED DESCRIPTION

It is anticipated that DCE networks will be used in applications over long distances (10 s of km to perhaps 100 km or more), including disaster recovery and encapsulation of Fibre Channel storage area networks, such as those used for XRC and Global Mirror applications. In addition, the topology of a DCE network may require large-scale distances, even if the source and the destination are not geographically far apart. For example, a multiple-switch fabric may be used to interconnect nodes on different floors of adjacent office buildings. Both long distance networks and large-scale networks may be considered "extended distance" networks. The current back-propagating credit based flow control proposed for DCE may not be extensible to these distances. While the final specification for DCE has to yet been released, it may be assumed that credit based flow control operation over extended distances will require far more link buffering than will be affordable for the vast majority of Network Interface Card (NIC) designs. Even if it is possible to physically extend these links, high performance requires that the links be filled with data all times. Otherwise, buffer credit starvation may result in unacceptably poor performance.

According to an exemplary embodiment, reliability at the link layer in a large DCE work is enhanced by managing flow control and compensating for the effects of extended distances in hardware at the NIC level.

Figure 1:
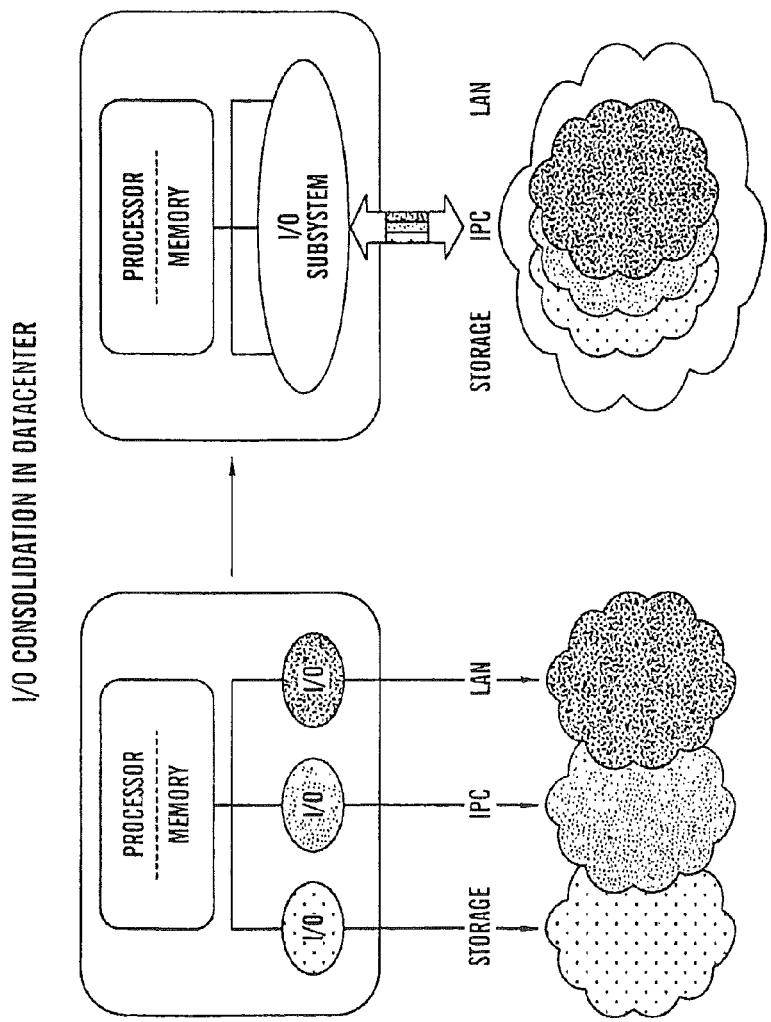
FIG. 1 illustrates a proposed consolidation of traffic in a Data Center Ethernet (DCE) network.
Figure 2:
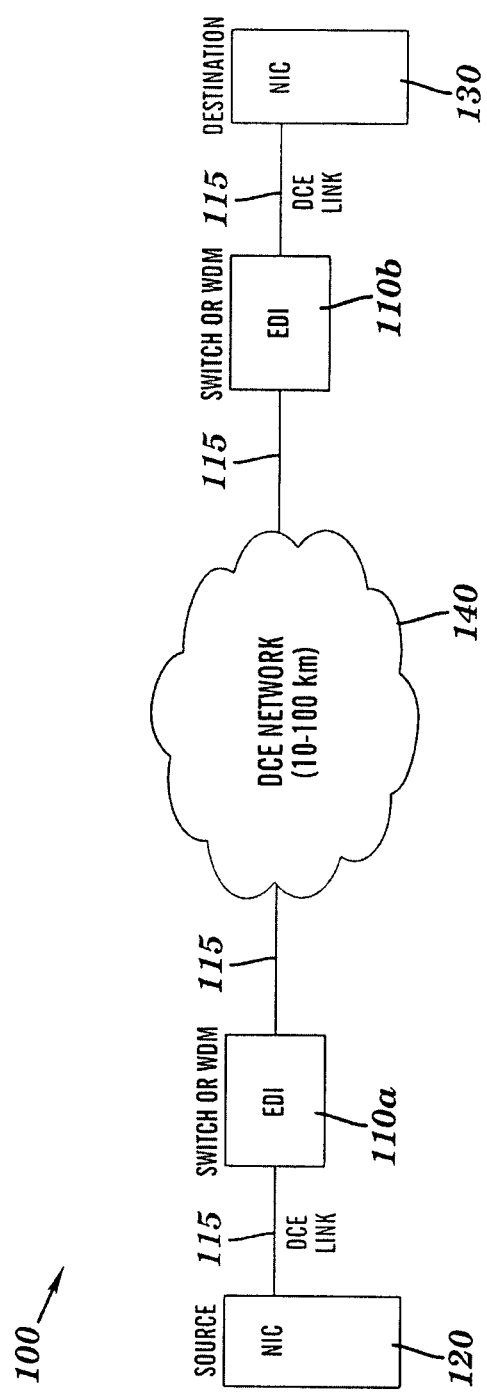
FIG. 2 illustrates an extended DCE fabric according to an exemplary embodiment.

A basic extended DCE fabric 100 is shown in FIG. 2. The fabric includes an extended DCE network 140 across which packets travel. Extended distance interfaces (EDIs) 110a and 110b are represented in FIG. 2 as switch ports that may have a pluggable optical transceiver designed for extended distances. However, a stand-alone DCE channel extension product or wavelength division multiplexer (WDM) may also be used to implement the functions of an EDI. For simplicity of explanation, the description that follows largely refers to the Edits as if they were implemented with modified switch ports. Whether implemented as a switch port, stand-alone product, or WDM, the EDI needs to have knowledge of the ports that are being extended over long distances. This may be determined, for example, by simply reading the vital product data (VPD) associated with the pluggable optics on a switch port or by configuring the switch through a software management interface or other means. Once this is determined, the optimal buffer credit management may be activated. This is described in further detail below with regard to FIG. 7.

As shown in FIG. 2, the EDIs 110a and 110b are interspersed between a source node 120 and a destination node 130. The source node 120 and the destination node 130 each include an NIC and communicate with each other via the DCE link 1115 and the DCE network 140. Although only two EDIs are shown in the figures and described herein, it should be appreciated that any suitable number of EDIs may be used.

Figure 3:
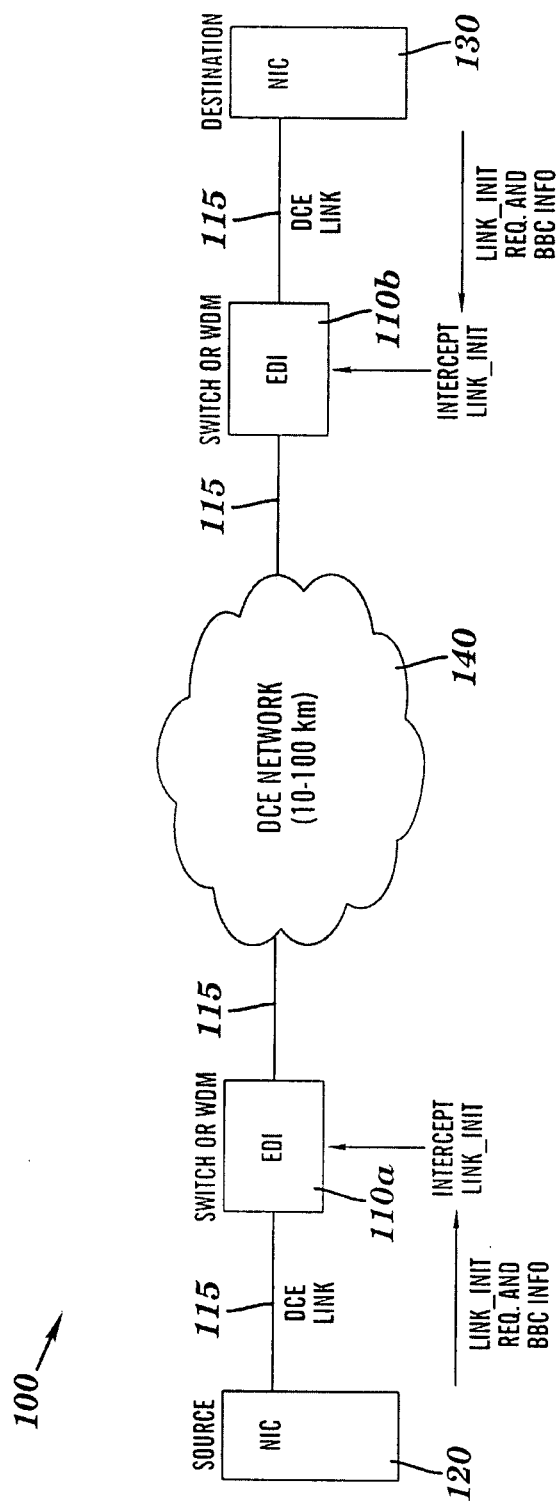
FIG. 3 illustrates interception of an initialization sequence between a source node extended a destination node in an extended DCE fabric according to an exemplary embodiment.

As shown in FIG. 3, the EDIs 110a and 110b may eavesdrop on the initialization sequence between the source node 120 and the destination node 130. During this sequence, both the source node 120 and the destination node 130 determine the available buffer credits for data transmission, i.e., the buffer space available in each node for receiving packets.

Traditionally, buffer-to-buffer credit (BBC) information is exchanged between the nodes, such that each node is made aware of the buffer credit available in the other node. As part of the initiation process, the smaller buffer (whether it be in the source node or in the destination node) controls how much data can be transmitted between the nodes.

Figure 4:
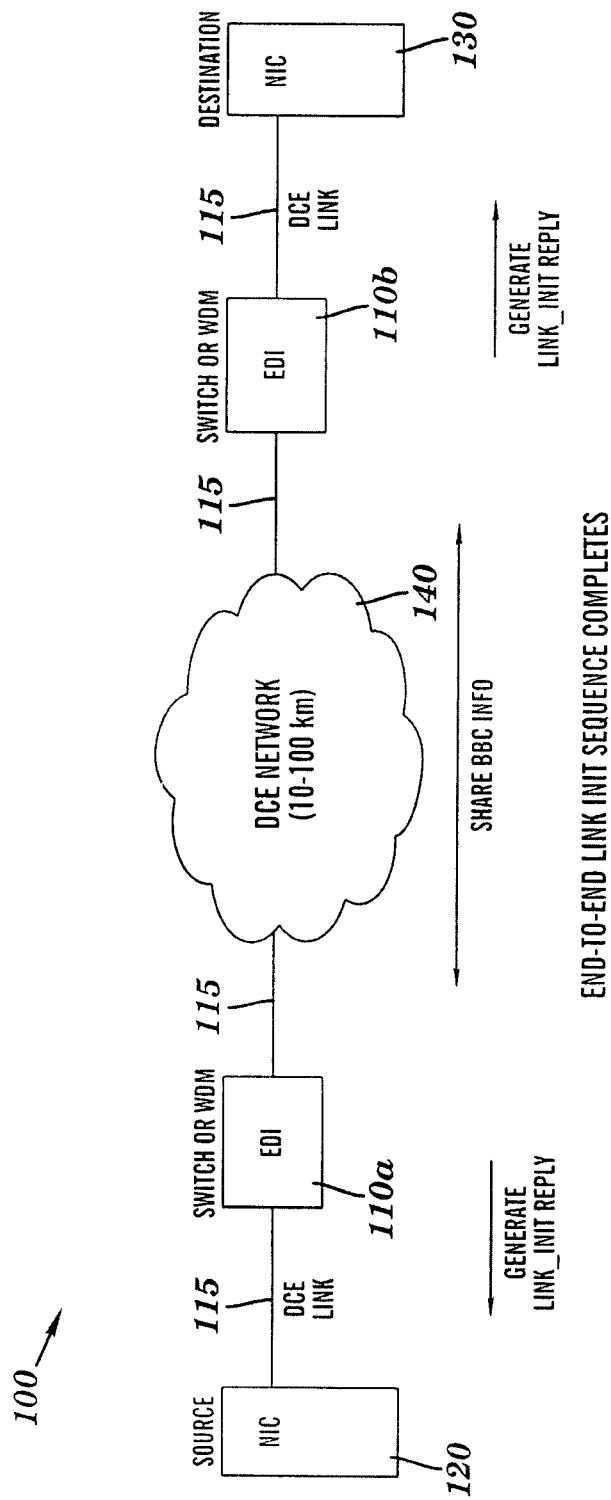
FIG. 4 illustrates sending of replies to the source node and destination node in the extended DCE fabric according to an exemplary embodiment.

As shown in FIG. 3, rather than allowing the initiation sequence to take place uninterrupted, the EDIs 110a and 110b may intercept buffer credit reports from either side of the network 140. As shown in FIG. 4, the EDIs 110a and 110b may then insert their own link initialization responses that actually indicate the buffer credit available in the EDIs. The result may be considered a "virtualized" link initialization sequence from the EDI 110a to the source node 120 and from the EDI 110b to the destination node 130.

Figure 5:
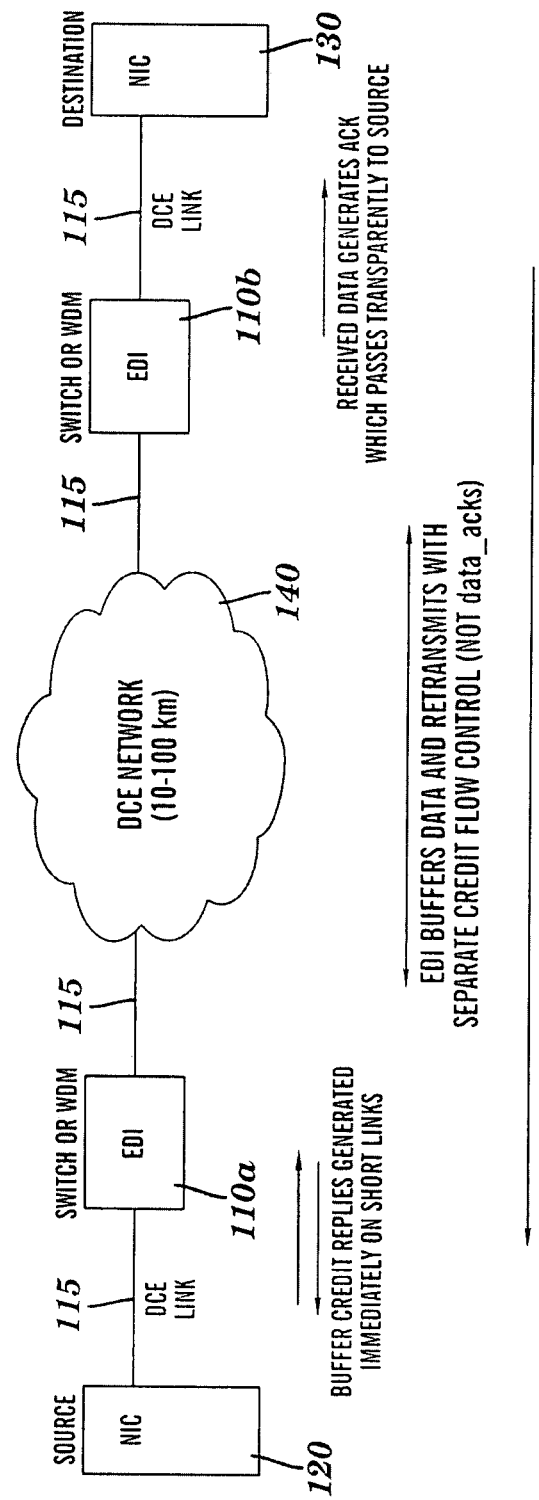
FIG. 5 illustrates buffer credit replies and retransmission of EDI buffered data according to an exemplary embodiment.

The EDIs 110a and 110b may include control logic that controls this interception and insertion of buffer credit information, illustrated and described in detail below with reference to FIG. 7. As shown in FIG. 5, once link initialization is complete, the EDIs 110a, 110b transmit their own buffer credits to the source node 120 and the destination node 130, respectively, making it appear as if the source node and destination node are both connected over a very short link. The EDIs 110a and 110b may generate replies indicating available buffer credit and transmit them to the source node 120 and the destination node, respectively. Since both the source node 120 and the destination node receive a continuous stream of buffer credit acknowledgements, they will provide a continuous stream of data packets. This serves to keep the long link filled and improves performance. Further details about transmission of packets and acknowledgement of receipt of packets are provided in commonly assigned U.S. patent application Ser. No. 11/847,965, herein incorporated by reference. Further details of PSNs are provided in commonly assigned U.S. patent application Ser. No. 11/426,421, herein incorporated by reference.

Figure 6:
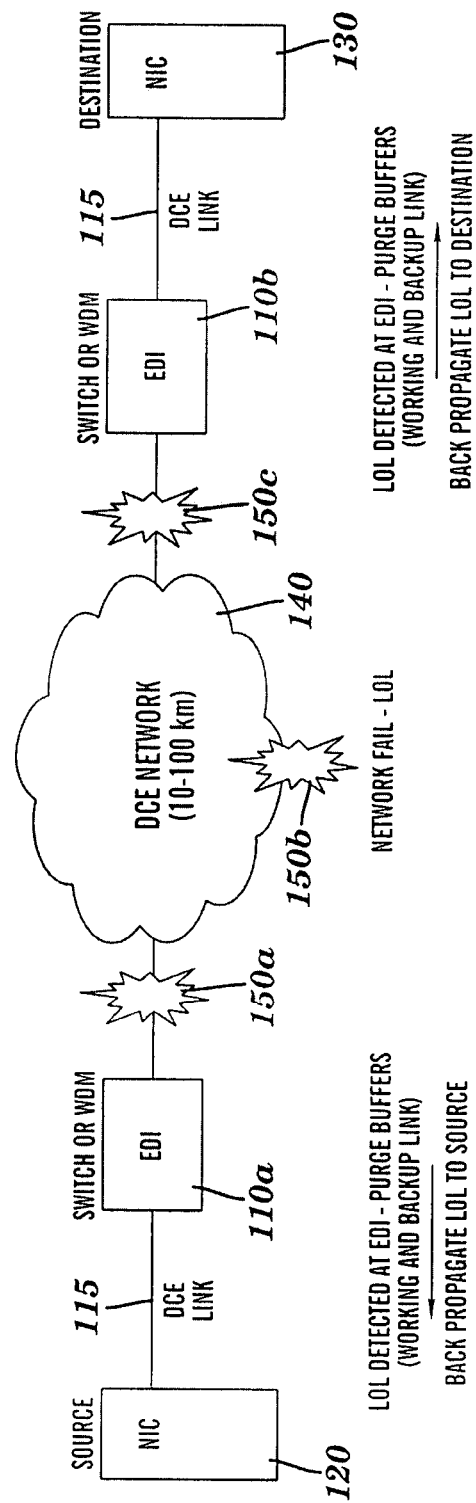
FIG. 6 illustrates recovery in an extended DCE fabric according to an exemplary embodiment.

A significant issue with this approach is recovery from a link failure after the EDIs have reported successful receipt of the packets. According to an exemplary embodiment, recovery is performed by the EDIs, not by the attached source and destination nodes. Each EDI is designed with a sufficiently large data buffer to accommodate, e.g., a 100 km link. As shown in FIG. 6, when a link error occurs, such as the failure to deliver a packet, the EDIs 110a and 110b recognize this condition and perform recovery from their own buffers, retransmitting packets as needed for recovery. Thus, recovery is not left up to the source and destination nodes, but is, instead, performed by the EDIs. Link errors are represented in FIG. 6 with reference numerals 150a and 150c.

A special case of link failure, represented with reference numeral 150b, is loss of light (LOL). This type of link failure may be assumed to invalidate all data in flight on the network. In this case, the EDIs 110a and 110b purge their buffers, invalidate packets in flight, prevent storage of invalid packets in the buffers, and wait for the virtual EDI interface link to re-initialize. The EDIs 110a and 110b propagate LOL failure to the source and destination nodes 120 and 130, respectively, so that the nodes will stop sending packets. Once the source and destination nodes are informed of the LOL failure by the EDIs, the source and destination nodes purge their buffers.

This handling of link failure differs from other types of link extension technology that have been previously proposed. The link failure recovery according to exemplary embodiments ensures end-to-end data integrity over an extended distance link while also providing maximum perform over longer distances than would be achievable using only DCE flow control.

Figure 7:
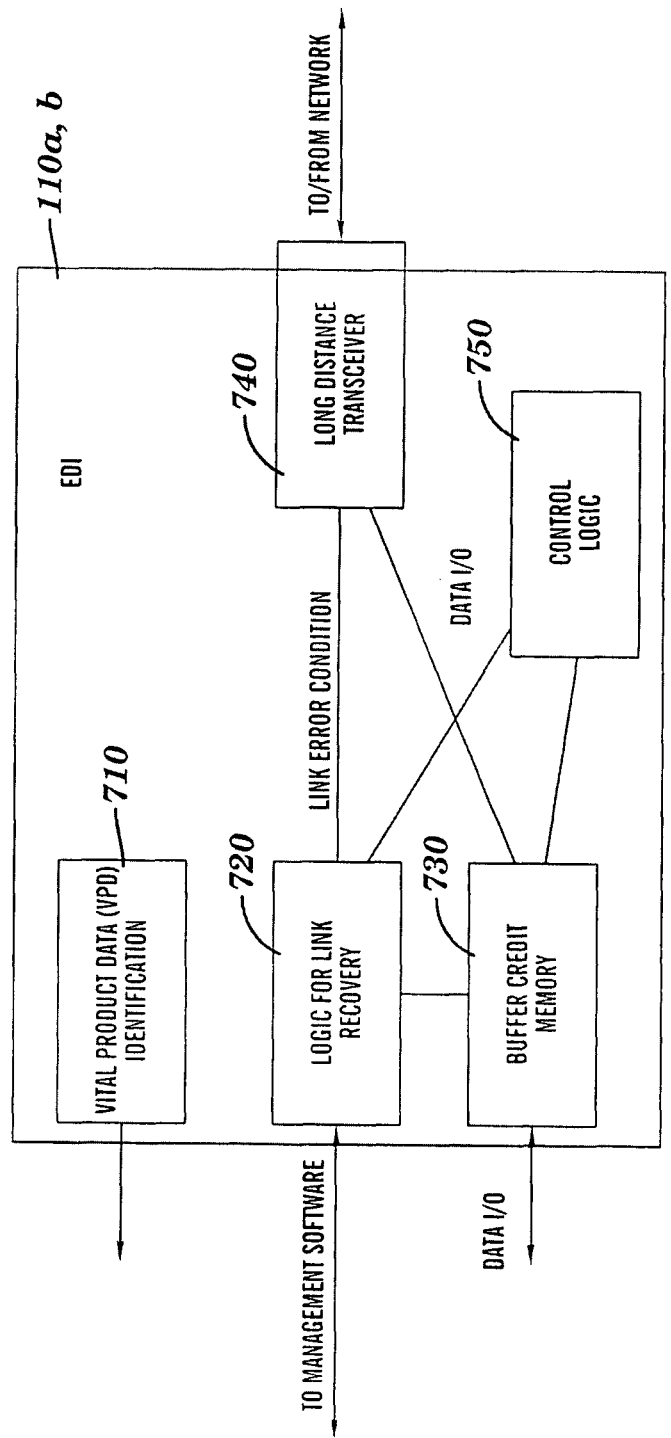
FIG. 7 illustrates a detailed view of an EDI according to an exemplary embodiment.

FIG. 7 illustrates a detailed view of an EDI such as that shown in FIGS. 2-6 according to an exemplary embodiment. The EDIs 110a, 110b may each include components similar to those found in a switch in a DCE network, such as a vital product data (VPD) identification component 710, a buffer credit memory 730, and control logic 750. Unlike conventional switches, however, the EDI includes an optical transceiver 740 designed for long haul transmissions. Also, the buffer credit memory 730 may be larger the buffers found in traditional switches, to accommodate data received over long distances. As an alternative, an EDI may be implemented with an existing switch by plugging in the optical transceiver and either using buffer credit pooling or swapping the buffer memory card with a card having more buffer memory. If the buffer memory card is swapped out, the buffer credit memory in the EDI is reported to management software in a management module in the network. If buffer poling is used, the amount of credits that are needed by the EDI may be determined by a management module under the control of a network administrator. If a new buffer memory card pluggable optics are inserted, the EDI can recognize them using the VPD identification unit 710. The EDI also includes logic for link recovery 720. The logic for link recovery receives an indication of a link error condition from the long distance optical transceiver 740 and works in congestion with the control logic 750 and the buffer credit memory 730 to recover from link errors by either performing recovery the buffer 730 or, in the case of a LOL, purging the buffer 730, invalidating packets in flight and waiting for reinitialization.

According to exemplary embodiment, operation of lossless DCE over extended distances is enabled. Higher performance and bandwidth utilization on long links is also enabled.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for managing flow control in a data center Ethernet (DCE) network, comprising:

intercepting at least one source buffer credit report transmitted from a source node to a destination node, by at least one first extended data interface (EDI) interspersed on a DCE link during an initiation sequence between the source node and the destination node in the DCE network for determining buffer credits available for receiving packets, wherein the source node and the destination node are separated by an extended distance, and the first EDI is connected to the source node by a link that is shorter than the extended distance;

intercepting at least one destination buffer credit report transmitted from the destination node to the source node by a second EDI, the second EDI interspersed on the DCE link between the first EDI and the destination node and connected to the destination node by a link that is shorter than the extended distance;

generating at least one first link initialization response to the source buffer credit report by the first EDI in response to intercepting the source buffer credit report and sending the at least one first link initialization response to the source node by the first EDI, the first link initialization response indicating buffer credits available in the first EDI;

generating at least one second link initialization response to the destination buffer credit report by the second EDI in response to intercepting the destination buffer credit report and sending the at least one second link initialization response to the destination node by the second EDI, the second link initialization response indicating buffer credits available in the second EDI;

completing the initiation sequence based on the link initialization responses from the first and second EDIs; and based on a loss of light link failure, performing a link recovery, the link recovery including:

invalidating all packets in flight in the network;

purging the first EDI and transmitting a first link failure signal to the source node by the first EDI, the first link failure signal causing the source node to purge packets stored therein; and purging the second EDI and transmitting a second link failure signal to the destination node by the second EDI, the second link failure signal causing the destination node to purge any packets stored therein.

2. The method of claim 1, further comprising continuously providing replies to the source node from the first EDI and replies to the destination node from the second EDI regarding available buffer credits in the extended data interface.

3. The method of claim 1, wherein the at least one first and second link initialization responses generated by the first and second EDIs makes it appear to the source node and to the destination node that a link between the nodes is short.

4. The method of claim 1, wherein the extended distance between the source node and the destination node spans across a multiple-link large-scale DCE fabric.

5. The method of claim 1, wherein purging the first EDI and the second EDI includes purging packets stored in buffers in the first EDI and the second EDI.

6. The method of claim 5, wherein the link recovery further includes preventing storage in the buffers of received invalid packets until re-initialization of the DCE link.

7. A system for managing flow control in a data center Ethernet (DCE) network, comprising:

a source node for transmitting and receiving packets;

a destination node for receiving packets and transmitting packets, wherein the source node and the destination node are separated by an extended distance;

a first extended data interface (EDI) interspersed on a DCE link between the source node and the destination node and connected to the source node by a link that is shorter than the extended distance, wherein the first EDI is configured to intercept at least one source buffer credit report transmitted from the source node to the destination node during an initiation sequence between the source node and the destination node for determining buffer credits available for receiving packets, wherein the first EDI is configured to generate at least one first link initialization response to the source buffer credit report in response to intercepting the source buffer credit report and send the at least one first link initialization response to the source node, the first link initialization response indicating buffer credits available in the first EDI; and a second EDI interspersed on the DCE link between the first EDI and the destination node and connected to the destination node by a link that is shorter than the extended distance, wherein the second EDI is configured to intercept at least one destination buffer credit report transmitted from the destination node to the source node during the initiation sequence, wherein the second EDI is configured to generate at least one second link initialization response to the destination buffer credit report in response to intercepting the destination buffer credit report and send the at least one second link initialization response to the destination node, the second link initialization response indicating buffer credits available in the second EDI, and wherein the system is configured to complete the initiation sequence based on the link initialization responses from the first and second EDIs;

wherein the first EDI and the second EDI are configured to perform a link recovery based on a loss of light link failure, the link recovery including:

invalidating all packets in flight in the network;

purging the first EDI and transmitting a first link failure signal to the source node by the first EDI, the first link failure signal causing the source node to purge any packets stored therein; and purging the second EDI and transmitting a second link failure signal to the destination node by the second EDI, the second link failure signal causing the destination node to purge any packets stored therein.

8. The system of claim 7, wherein the extended data interface continuously provides replies from the first EDI to the source node and replies from the second EDI to the destination node regarding available buffer credits.

9. The system of claim 7, wherein the at least one first and second link initialization responses generated by the first and second EDIs makes it appear to the source node and the destination node that a link between the nodes is short.

10. The system of claim 7, wherein the extended distance between the source node and the destination node spans across a multiple-link large-scale DCE fabric.

11. The system of claim 7, wherein purging the first EDI and the second EDI includes purging packets stored in buffers in the first EDI and the second EDI.

12. The system of claim 11, wherein the link recovery further includes preventing storage in the buffers of received invalid packets until re-initialization of the DCE link.

13. An apparatus for managing flow control in a data center Ethernet (DCE) network, comprising:

a first extended data interface (EDI) interspersed on a DCE link between a source node and a destination node, wherein the source node and the destination node are separated by an extended distance and the first EDI is connected to the source node by a link that is shorter than the extended distance, the first EDI including:

a first long-haul transceiver configured to intercept at least one source buffer credit report transmitted from the source node to the destination node during an initiation sequence between the source node and the destination node in the DCE network, a first buffer credit memory for storing packets;

control logic configured to determine buffer credits available in the first buffer credit memory for storing packets, generate at least one first link initialization response to the source buffer credit report in response to intercepting the buffer credit report and send the at least one first link initialization response indicating buffer credits available in the first buffer credit memory to the source node; and link recovery logic configured to, based on a loss of light link failure, purge packets stored in the first buffer credit memory, invalidate all packets in flight in the network, and transmit a first link failure signal to the source node, the first link failure signal causing the source node to purge packets stored therein; and a second EDI interspersed on the DCE link between the first EDI and the destination node and connected to the destination node by a link that is shorter than the extended distance, the second EDI including:

a second long-haul transceiver configured to intercept at least one destination buffer credit report transmitted from the destination node to the source node during the initiation sequence;

a second buffer credit memory for storing packets;

control logic configured to determine buffer credits available in the second buffer credit memory, generate at least one second link initialization response to the destination buffer credit report in response to intercepting the destination buffer credit report and send the at least one second link initialization response indicating buffer credits available in the second buffer credit memory to the destination node; and link recovery logic configured to, based on the loss of light link failure, purge packets stored in the second buffer credit memory, invalidate all packets in flight in the network, and transmit a second link failure signal to the destination node, the second link failure signal causing the destination node to purge packets stored therein.

14. The apparatus of claim 13, wherein the transceiver is configured to continuously provide replies from the first EDI to the source node and replies from the second EDI to the destination node regarding available buffer credits.

15. The apparatus of claim 13, wherein the at least one first and second link initialization responses generated by the control logic makes it appear to the source node and the destination node that a link between the nodes is short.

16. The apparatus of claim 13, wherein the extended distance between the source node and the destination node spans across a multiple-link large-scale DCE fabric.

17. The apparatus of claim 13, wherein the link recovery logic is configured to prevent storage in the first buffer credit memory and the second buffer credit memory of received invalid packets until re-initialization of the DCE link.

* * * * *